(12) United States Patent
Hayashi et al.

(10) Patent No.: US 7,278,313 B2
(45) Date of Patent: Oct. 9, 2007

(54) STRUCTURES FOR SUPPORTING VIBRATORS AND DEVICES FOR MEASURING PHYSICAL QUANTITIES

(75) Inventors: Shigeki Hayashi, Ama-gun (JP); Takayuki Kikuchi, Nagoya (JP); Yusuke Kinoshita, Kamiina-gun (JP)

(73) Assignees: NGK Insulators, Ltd., Nagoya City (JP); Seiko Epson Corporation, Shinjuku-Ku (JP)

( * ) Notice: Subject to any disclaimer, the term of this patent is extended or adjusted under 35 U.S.C. 154(b) by 78 days.

(21) Appl. No.: 11/215,767

(22) Filed: Aug. 30, 2005

(65) Prior Publication Data

US 2006/0053884 A1 Mar. 16, 2006

(30) Foreign Application Priority Data

Sep. 10, 2004 (JP) ............................ P2004-263320
Jul. 15, 2005 (JP) ............................ P2005-207260

(51) Int. Cl.
*G01P 9/04* (2006.01)
(52) U.S. Cl. .................................. 73/504.12; 310/351
(58) Field of Classification Search ............ 73/504.12, 73/504.14; 310/351
See application file for complete search history.

(56) References Cited

U.S. PATENT DOCUMENTS 7,000,472 B2 * 2/2006 Kinoshita ................ 73/504.12

2003/0141340 A1 7/2003 Ishikawa et al.
2004/0226978 A1 11/2004 Ishikawa et al.

FOREIGN PATENT DOCUMENTS

| JP | 2001-012955 | 1/2001 |
| JP | 2003-028648 | 1/2003 |
| JP | 2003-294450 | 10/2003 |

OTHER PUBLICATIONS

U.S. Appl. No. 11/214,455, filed Aug. 29, 2005, Hayashi et al.

* cited by examiner

*Primary Examiner*—John E. Chapman
(74) *Attorney, Agent, or Firm*—Burr & Brown

(57) ABSTRACT

It is provided a supporting structure having a substrate 12 and bonding wires 14A, 14B fixed onto the substrate 12 and connected to a vibrator 1. The substrate 12 has a pair of fixed portions 12a opposing each other and a pair of non-fixed portions 12b opposing each other. The fixed portions 12a and the non-fixed portions 12b together define a through hole 13A in the substrate 12. The vibrator 1 is supported with the bonding wire so that the vibrator 1 is not directly contacted with the substrate 12. The bonding wires 14A, 14B are fitted to the fixed portion 12a and is not fitted to any of the non-fixed portions 12b.

16 Claims, 20 Drawing Sheets

STRUCTURES FOR SUPPORTING VIBRATORS AND DEVICES FOR MEASURING PHYSICAL QUANTITIES

This application claims the benefits of Japanese Patent Applications P2005-207260 filed on Jul. 15, 2005, and P2004-263320 filed on Sep. 10, 2004, the entireties of which are incorporated by reference.

BACKGROUND OF THE INVENTION

1. Field of the Invention

The present invention provides a structure for supporting a vibrator and a device for measuring a physical quantity such as a vibratory gyroscope.

2. Related Art Statement

In a vehicle control system, a vibratory gyroscope and its vibrator are subjected to a wide temperature range including high and low temperatures. Such temperature range normally includes minus 40° C. to plus 85° C. and may be more wider in a more severe specification. Particularly when a vibrator is made of a piezoelectric single crystal, the temperature dependency of the single crystal may affect the stability of the gyroscope.

Japanese patent publication 2003-28648A discloses a member for supporting a vibrator for use in a vibratory gyroscope. According to the disclosure, the supporting member is composed of an elongate rod bent in a complex form so that the vibrator is supported with the rod. It is also described that the supporting member is electrically connected with an electrode formed on the vibrator.

Further, the assignee has filed Japanese patent publication 2003-294450A and disclosed that a vibrator is supported with bonding wires over a substrate in a package. The bonding wires are bonded with electrodes on the surface of the vibrator.

SUMMARY OF THE INVENTION

According to such supporting methods, however, a substantial temperature drift may be observed, for example, in a high temperature region. For example, as shown in FIG. 3, the zero point gyroscope signal may be rapidly increased in a room temperature range to result in a peak drift. If the vibrator exhibiting abnormality of oscillation would be used for a vibratory gyroscope, the zero point temperature drift in the detection signal would be increased so that the gyroscope might be inoperative as a sensor in the worst cases.

An object of the present invention is to provide a supporting structure for a device of measuring a physical quantity using a vibrator for reducing the zero point temperature drift of the detection signal.

The present invention provides a structure for supporting a vibrator. The structure comprises a substrate comprising a pair of fixed portions opposing each other and a pair of non-fixed portions opposing each other. The fixed and non-fixed portions together defines a through hole in the substrate, and a bonding wire is fitted to the substrate and connected to the vibrator. The vibrator is supported with the bonding wire so that the vibrator is not directly contacted with the substrate, and the bonding wire is fitted to the fixed portion and is not fitted to any of the non-fixed portions.

The present invention further provides a device for measuring a physical quantity comprising the supporting structure described above.

The inventors have studied the cause of the peak temperature drift, as shown in FIG. 3, and obtained the following findings. That is, the inventors have succeeded in substantially preventing the vibration of spurious mode of a vibrator and the adverse effects of the vibration of a bonding wire on the resulting detection signal. The inventors have studied the cause of the zero point temperature drift shown in FIG. 3, observed even after the prevention of the spurious vibration and adverse effects are prevented as described above. As a result, it is found that the vibration mode of a supporting substrate for supporting a vibrator may result in the temperature drift of the detection signal. Such effects of the supporting substrate has been overlooked by those who skilled in the art.

The inventors have further studied the design of bonding wires and a substrate based on the above discovery. According to the present invention, a through hole for inserting a bonding wire is provided in a supporting substrate. A pair of fixed portion and a pair of non-fixed portions are provided together defining the through hole. The fixed portion of the supporting substrate for supporting a vibrator is further fixed onto an underlying substrate such as a packaging substrate, and the non fixed portions are provided between the two fixed portions.

The fixed portion means a portion of the supporting substrate which is fixed onto the underlying substrate.

The non-fixed portion means a portion of the supporting substrate which is not fixed onto the underlying substrate.

The present inventors have reached the idea of connecting or fitting a bonding wire onto the fixed portion so that the bonding wire is not protruded from the non-fixed portion. It is thus possible to reduce the adverse effects of the vibration of the supporting substrate, having a characteristic frequency near the resonance frequency "fd" of driving vibration, on the detection signal, so that the zero point temperature drift can be prevented. The present invention is based on the above discovery.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 5 (*b*) is a front view showing the supporting structure of FIG. 5(*a*).

PREFERRED EMBODIMENTS OF THE INVENTION

According to a preferred embodiment, a vibrator has a driving vibration arm with a driving means provided therein, a detection vibration arm with a detecting means provided therein, and a base portion provided between the driving and detection vibration arms. Preferably, the vibrator further has an elongate connecting portion connecting the base portion and driving vibration arm. Although the present invention will be described referring to the present embodiment, the present invention is not limited to this type of vibrator.

Figure 1:
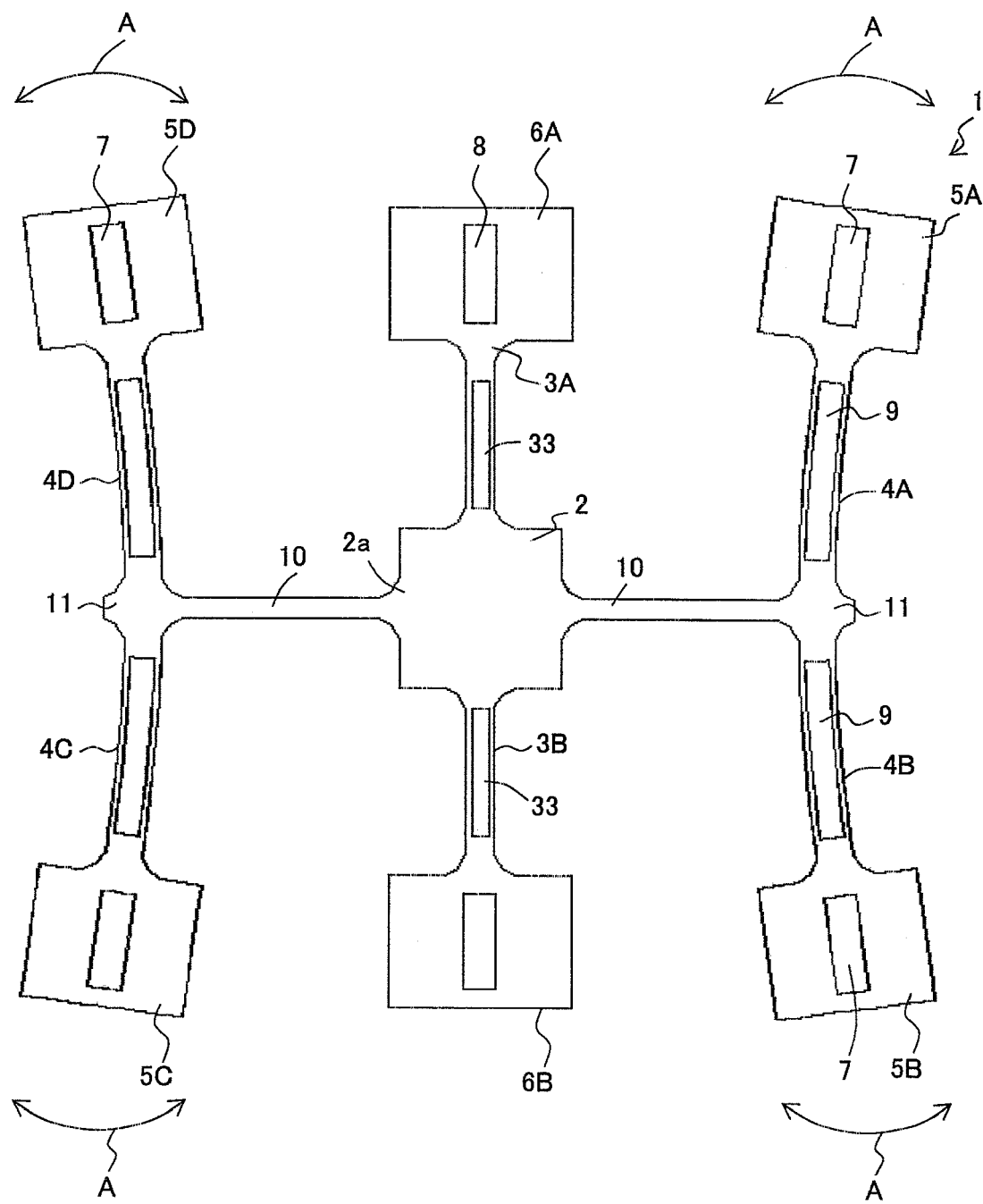
FIG. 1 is a plan view showing the driving vibration mode of a vibrator 1 usable in the present invention.
Figure 2:
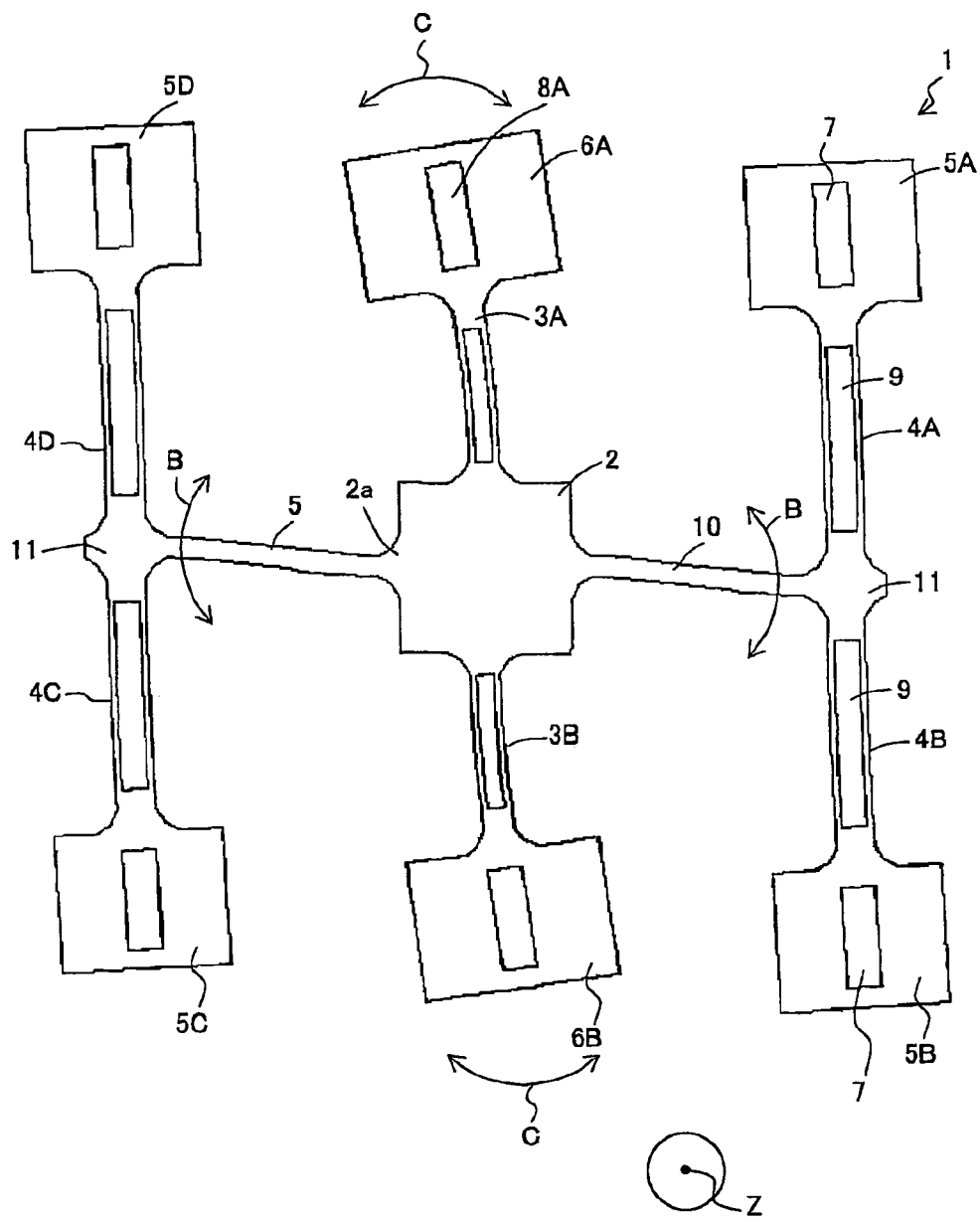
FIG. 2 is a plan view showing the detection vibration mode of a vibrator 1.

FIG. 1 is a plan view schematically showing a vibrator 1 (driving vibration mode) according to an embodiment of the present invention. FIG. 2 is a plan view showing the detection vibration mode of the vibrator 1.

The vibrator 1 according to the present example has a base portion 2, a pair of detection vibration arms 3A and 3B protruding from the base portion 2, a pair of connecting portions 10 each protruding from the base portion 2, and driving vibration arms 4A, 4B, 4C and 4D provided at the ends of the connecting portions 10, respectively. An elongate groove is formed in each of the main faces of the driving vibration arms 4A, 4B, 4C and 4D. Each of the driving vibration arms 4A to 4D substantially has a cross sectional shape of "H" character. A driving electrode 9 is formed in the groove. Wide or weight portions 5A, 5B, 5C and 5D are provided at the tip ends of the driving vibration arms 4A to 4D, respectively. Through holes 7 are formed in the wide portions, respectively.

An elongate groove is formed in each of the main faces of the detection vibration arms 3A and 3B. Each of the detection vibration arms 3A, 3B substantially has a cross sectional shape of "H" character. A detecting electrode 30 is formed in the groove. Wide or weight portions 3A and 3B are provided at the tip ends of the detection vibration arms 6A and 6B, respectively. Through holes 8 are formed in the wide portions, respectively.

FIG. 1 shows the driving vibration mode. When driving vibration is excited in the vibrator, each of the driving vibration arms 4A to 4D vibrates around the base 11 of the arm to the connecting portion 10 as its fulcrum, as an arrow "A". The vibrator 1 is rotated around a rotating axis (Z-axis) extending in a direction perpendicular to the vibrator 1. The connecting portion 10 then vibrates in bending vibration mode around the base of the connecting portion 10 to the fixing (base) portion 2 as its fulcrum, as an arrow "B". Responsive to the vibration, each of the detection vibration arms 3A and 3B vibrates in bending vibration mode around the base of the arm 3 to the fixing (base) portion 2, as an arrow "C". Each of the detection vibration arms 3A and 3B generates electrical signal corresponding to the detection vibration. The electrical signal is then utilized to calculate a turning angular rate around the rotating axis (Z axis).

Figure 5:
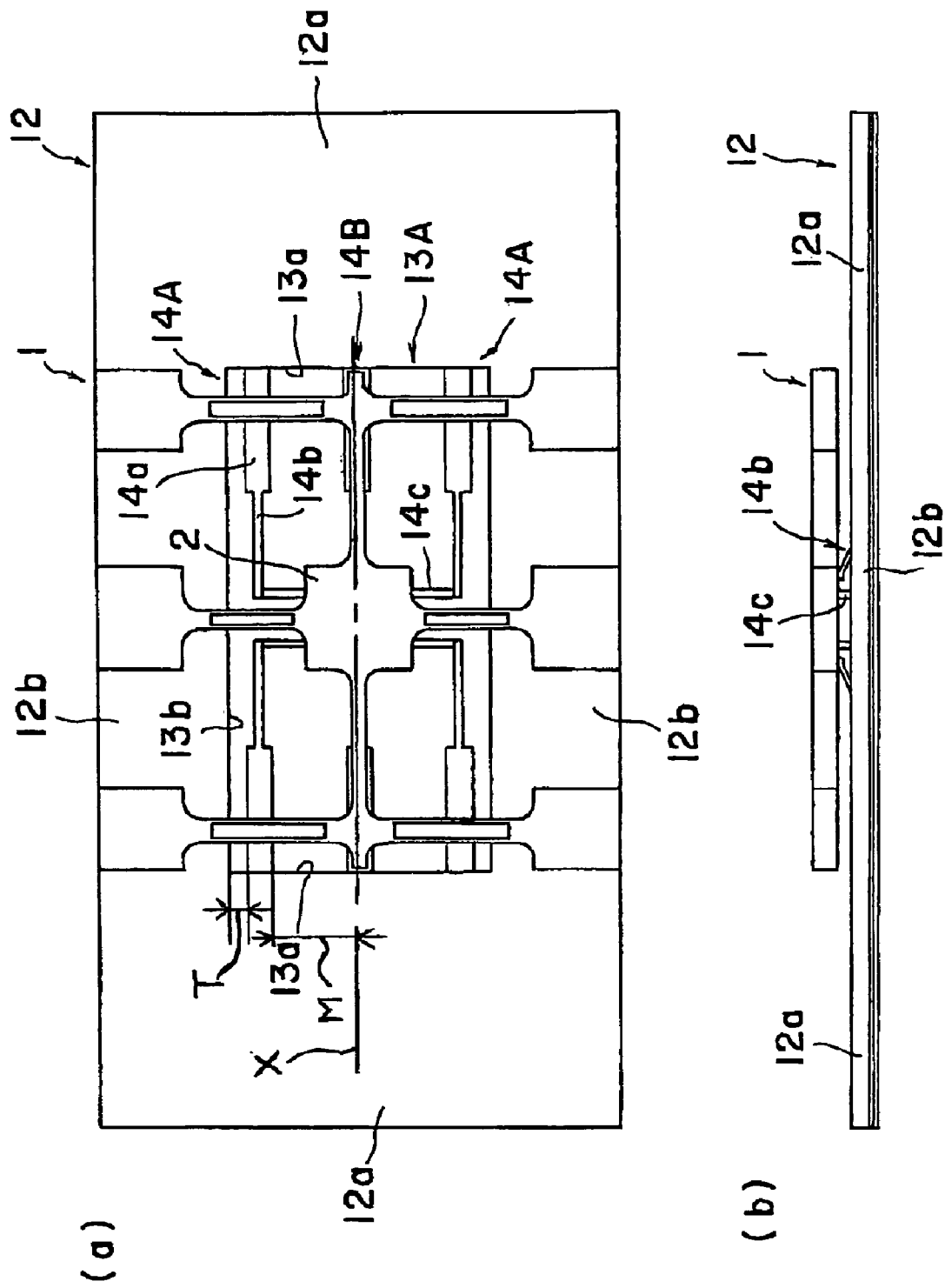
FIG. 5 (*a*) is a plan view schematically showing a supporting structure usable in the present invention.

FIG. 5 (a) is a plan view schematically showing a supporting structure used for the present invention. FIG. 5(b) is a front view showing a supporting structure of FIG. 5 (a).

A central through hole 13A is formed in a substrate 12. According to the present example, the through hole 13A has an elongate shape such as a rectangular shape. The substrate 12 has a pair of fixed portions 12a opposing each other and a pair of non-fixed portions 12b opposing each other. The fixed portions 12a and non-fixed portions 12b together define the through hole 13A. According to the present example, the fixed portion 12a has a larger width and the non-fixed portion has a smaller width. The fixed portions 12a are fixed onto an underlying substrate such as a packaging substrate.

The vibrator 1 is supported direct over the through hole 13A of the substrate 12. According to the present example, the vibrator is supported with four bonding wires 14A and two bonding wires 14B. Each of the bonding wires is joined with and fitted to the fixed portion 12a and is protruded from opposing edges 13a on the side of fixing portion 12a of the substrate 12 towards the base portion 2.

Each of the bonding wires 14A is protruded from each end of each opposing edge 13a and is bent substantially in the planar shape of "L" character. That is, the bonding wire 14A has a wider portion 14a formed in a direction substantially parallel with the opposing edge 13b facing the through holes 13, a narrower portion 14b, and a bent portion 14c formed in a direction substantially parallel with the opposing edge 13a. The tip end of the bent portion 14c is connected with an electrode formed in the base portion 2.

Further, two bonding wires 14B each protruding from the center of each opposing edge 13a has a wider portion 14a and a narrower portion 14b. The tip end of the narrower portion 14b is joined with the fixing portion 2. According to the present example, each of the bonding wires 14A and 14B has the wider portion 14a and a narrower portion 14b, so that the characteristic frequency of the vibration of the whole bonding wire can be controlled. The width of the bonding wire can be easily controlled by, for example, changing the mask width of a mask pattern used for patterning the bonding wire by etching.

According to the present invention, a distance "T" of the non-fixed portion 12b of the substrate and the root (protruding portion) 32 of the bonding wire protruding from the fixed portion 12a (See FIG. 5(a)) may preferably be 0.1 mm or more and more preferably be 0.2 mm or more for reducing the zero point temperature drift.

Further, according to the present invention, the root of the bonding wire to the fixed portion may preferably be provided near the central axis "X" of the substrate 12 passing across the fixed portion 12a, for reducing the zero point temperature drift. The distance "M" of the central axis "X" and the root (protruding position) of the bonding wire 14A to the fixed portion 12a may preferably be 0.5 mm or smaller and more preferably be 0.3 mm or smaller.

Figure 6:
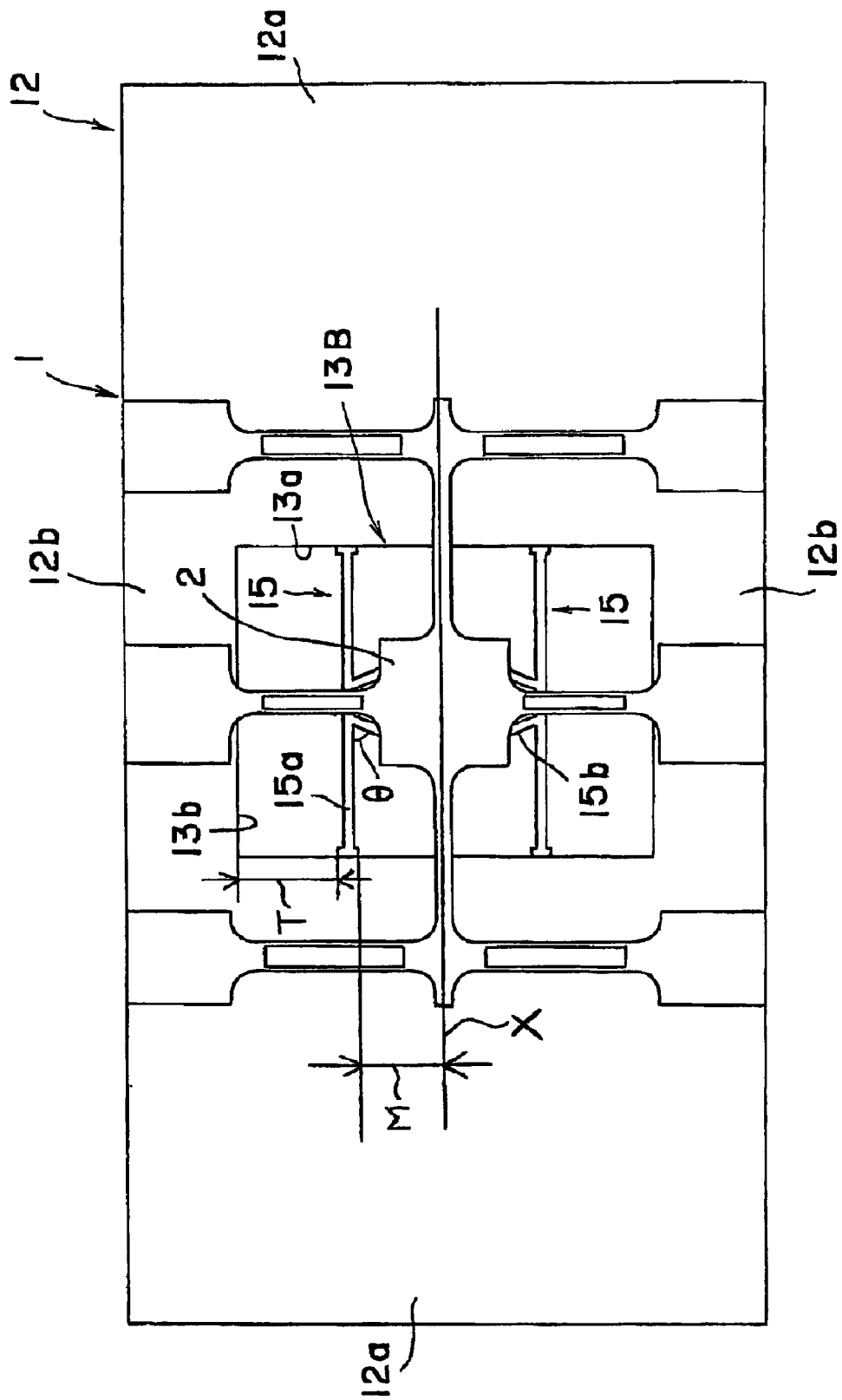
FIG. 6 is a plan view schematically showing a supporting structure according to another embodiment of the present invention.
Figure 7:
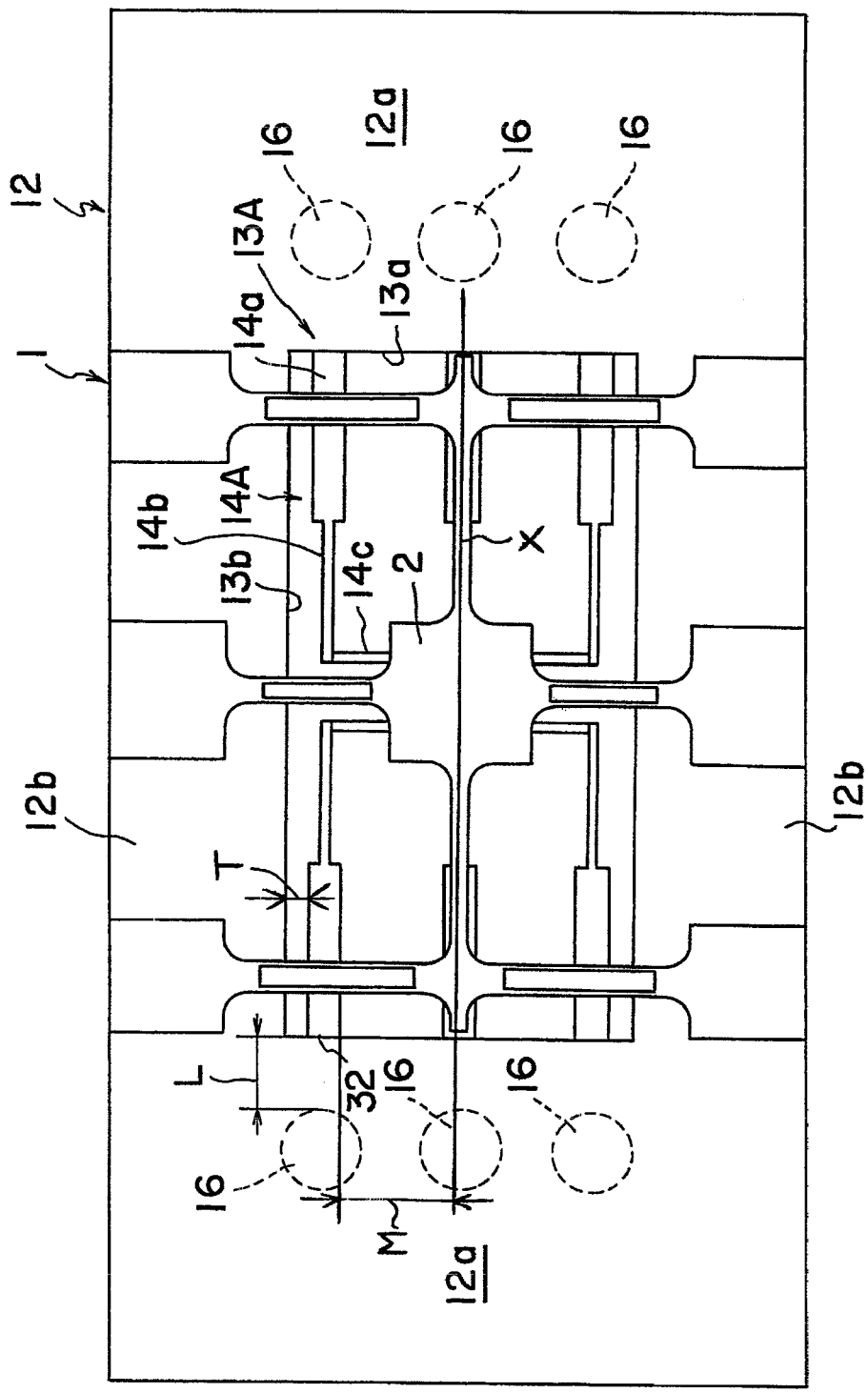
FIG. 7 is a plan view schematically showing a supporting structure according to another embodiment of the present invention.

According to an example shown in FIG. 6, the width of a through hole 13B is made narrower than that of the through hole 13A shown in FIG. 5, so that each bonding wire is made shorter. Such change of the length of the bonding wire results in a change of the characteristic frequency of the vibration of the bonding wire.

According to the present example, two bonding wires 15 are protruded from each of the opposing edges 13a on the side of the wider portion 12a of the substrate 12 towards the base portion 2. Each bonding wire 15 has a portion 15a extending in a direction substantially parallel with the opposing edge 13b, and a bent portion 15b bent towards the fixing portion 2. The tip end of the bent portion 15b is joined with an electrode on the fixing portion 2. The portions 15a and 15b may intersect each other at an angle "θ" of right angle as shown in FIG. 5 or an acute angle as shown in FIG. 6. The angle "θ" may be thus changed so as to change the characteristic frequency of the whole bonding wire.

Figure 9:
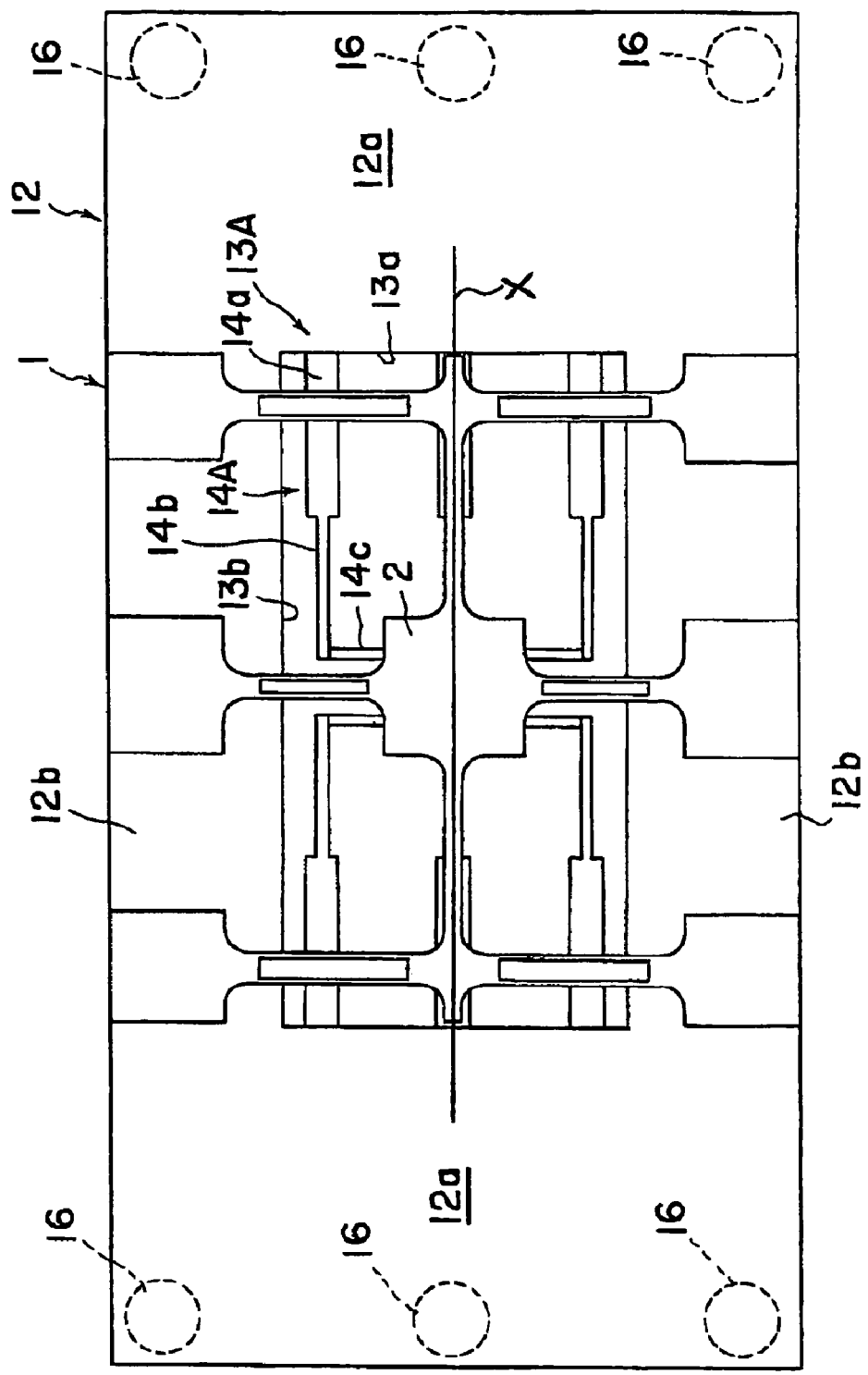
FIG. 9 is a plan view schematically showing a supporting structure according to still another embodiment of the present invention.

According to an example shown in FIG. 9, parts already shown in FIG. 5 are represented by the same numerals and the explanation may be omitted. The supporting substrate 12 for a vibrator is fixed onto an underlying substrate at predetermined positions, for example six positions 16. Each position 16 and each root 32 of each bonding wire to the substrate 12 are made close with each other, so that the influences of the vibration of the bonding wire on the detection voltage can be reduced.

The distance "L" between the fixing position 16 of the substrate 12 to the underlying substrate and the root 32 of the bonding wire to the substrate 12 may preferably be 0.6 mm or smaller and more preferably be 0.4 mm or smaller.

Figure 8:
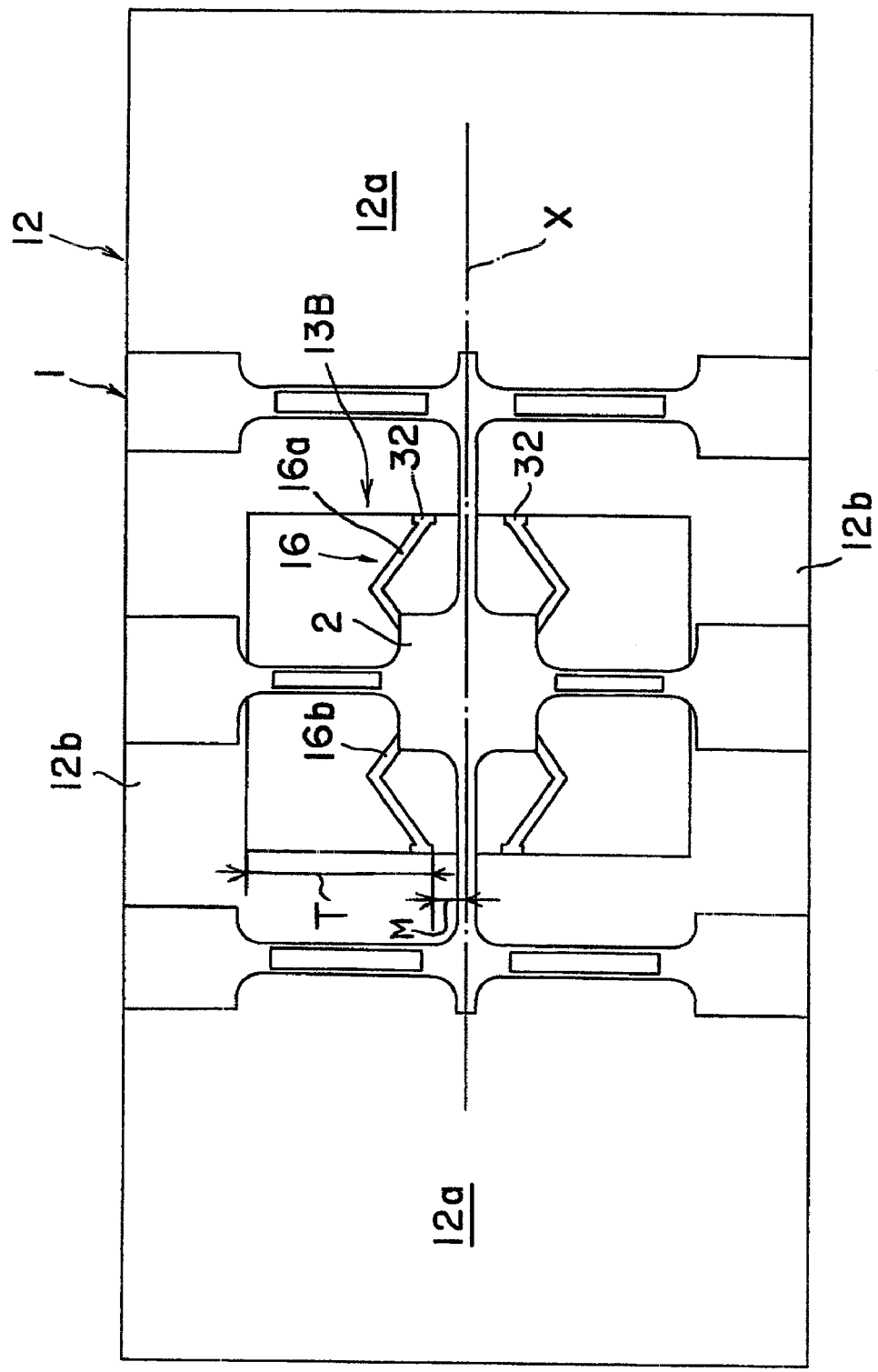
FIG. 8 is a plan view schematically showing a supporting structure according to still another embodiment of the present invention.

FIG. 8 is a plan view schematically showing a supporting structure according to still another embodiment of the present invention.

According to the present example, a bonding wire 16 is formed of bent portions 16a and 16b, and the root of the portion 16b is made distant from a narrower non-fixed portion 12b and made closer to X-axis, which is the central axis of the substrate 12. When the substrate 12 vibrates, the magnitude of the non-fixed portion 12b is particularly large. The root 32 of the bonding wire 16 from the substrate 12 is thus made distant from the narrower portion 12b and made close to the X-axis, so that the influences of the vibration of the substrate 12 on the detection value of the vibration mode of the vibrator 1 can be effectively prevented.

Figure 10:
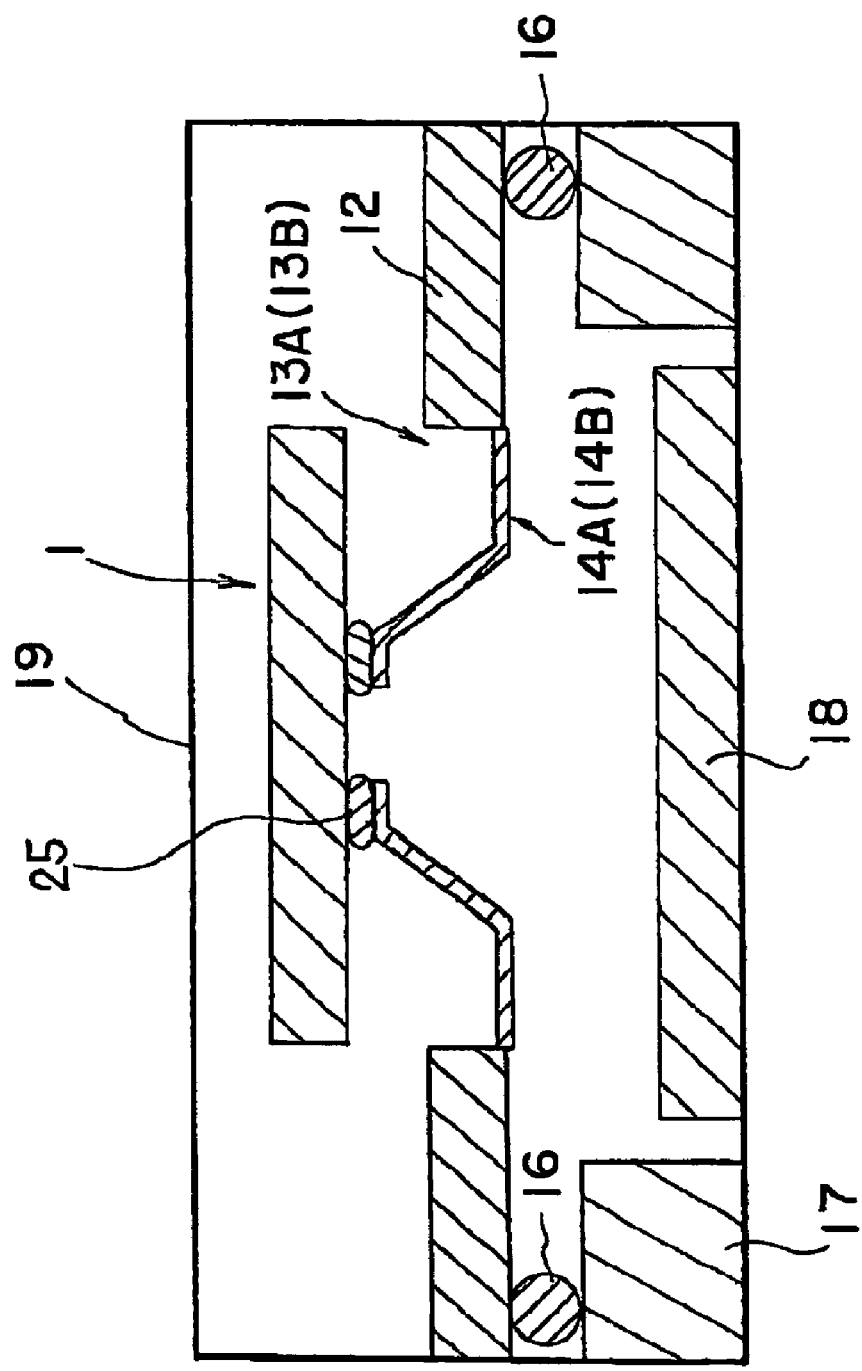
FIG. 10 is a cross sectional view showing a supporting structure of FIG. 9.

According to an example of FIG. 9, both ends of a fixed portion 12a of the substrate 12 is fixed onto the fixing portion 16. The method of fixing is not particularly limited and may be adhesion with a conductive adhesive, welding or the like. Preferably, as schematically shown in FIG. 10, the vibrator 1, substrate 12 and bonding wires 14A (14B) are contained in a package 19 and a table 17 and an IC chip 18 are mounted thereon. The substrate 12 is mounted on the table 17 through the conductive adhesive 16, which is then heated to fix the substrate 12 onto the table 17 by adhesion.

Although the kind of the conductive adhesive is not particularly limited, carbon paste and noble metal pastes such as copper, silver, gold paste etc. may be listed.

Figure 11:
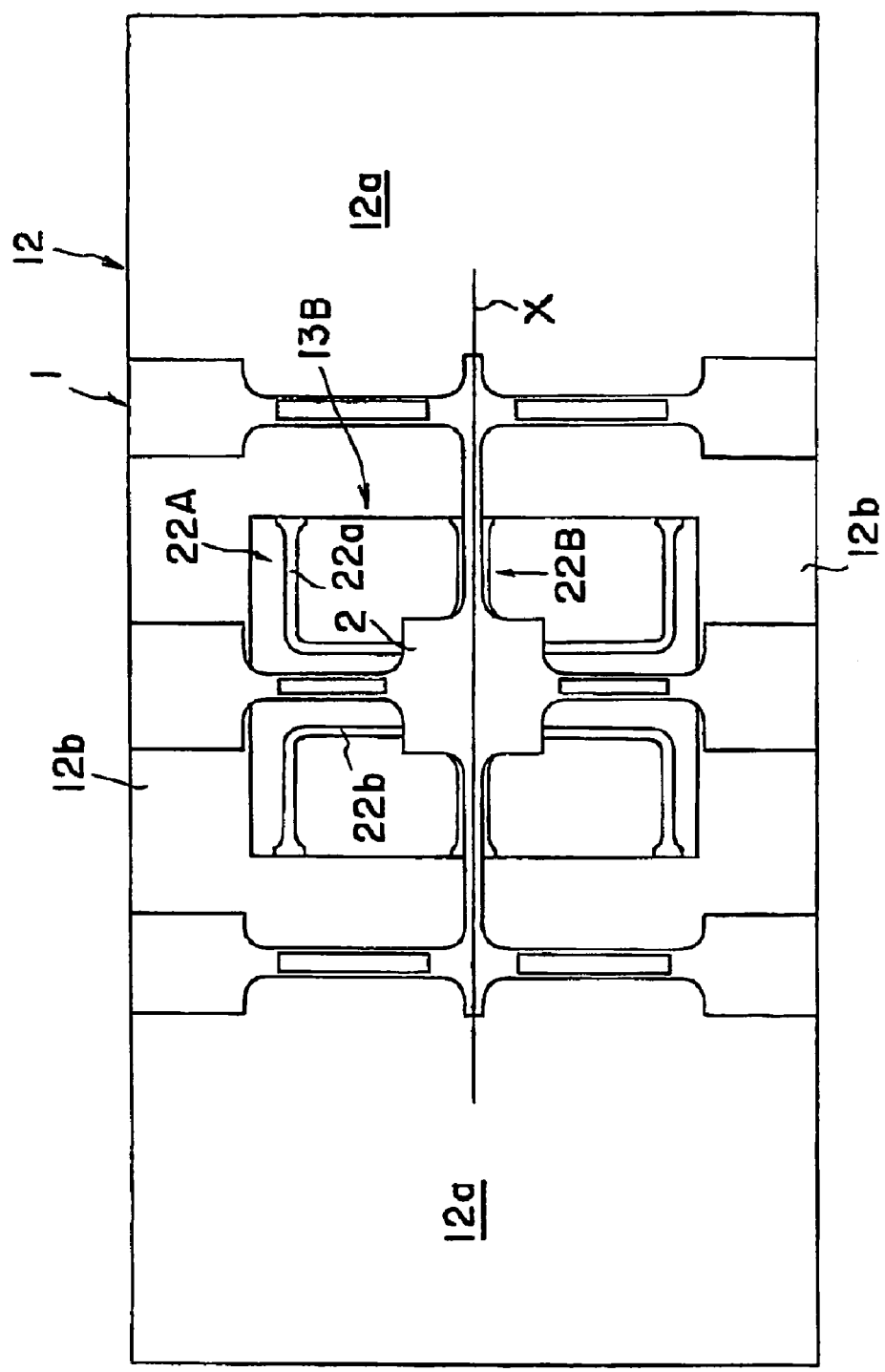
FIG. 11 is a plan view schematically showing a supporting structure according to still another embodiment of the present invention.

According to an example shown in FIG. 11, each of the bonding wires 22A and 22B has substantially the same shape as the bonding wire shown in FIG. 5. According to the present example, however, the width of a central through hole 13B of the substrate 12 is narrower than that shown in FIG. 5 and substantially has a planar shape of a square.

Figure 12:
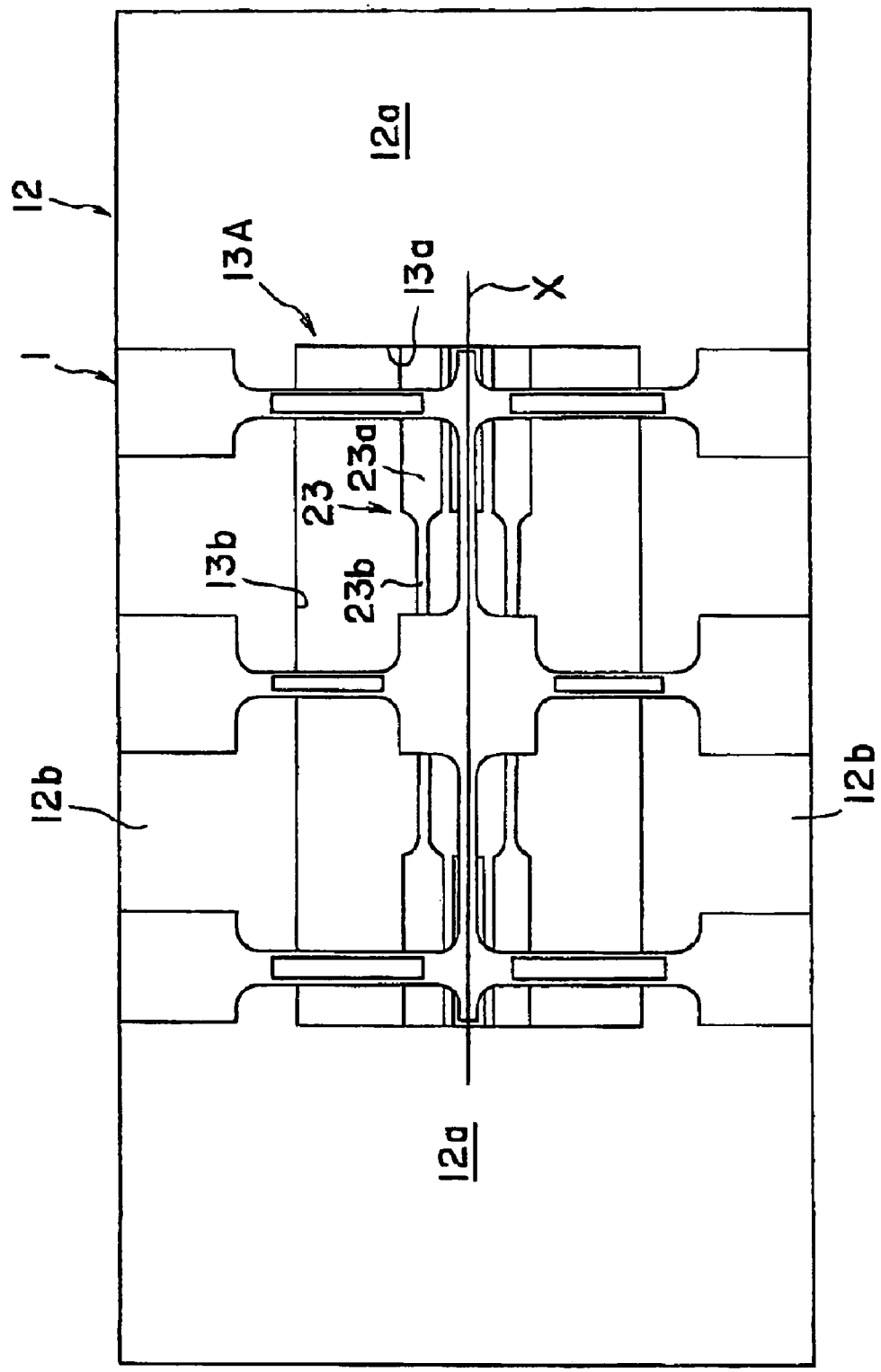
FIG. 12 is a plan view schematically showing a supporting structure according to still another embodiment of the present invention.

According to an example shown in FIG. 12, for example six bonding wires 23 are extended straightly from opposing edges 13a on the side of the fixed portions 12a into the through hole 13A. Each bonding wire 23 has a wider portion 23a and a narrower portion 23b joined with the base portion 2.

Figure 13:
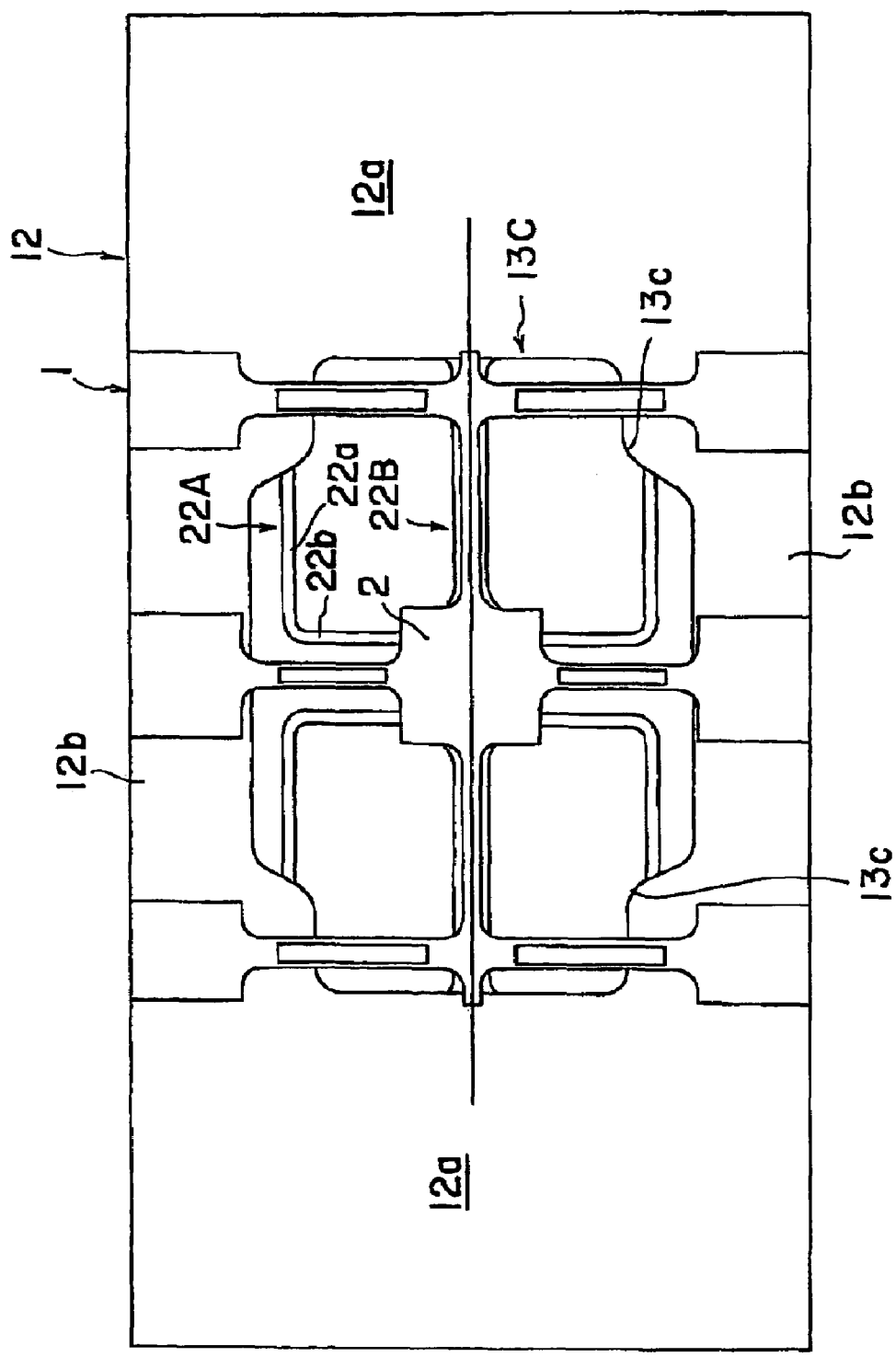
FIG. 13 is a plan view schematically showing a supporting structure according to still another embodiment of the present invention.

A supporting structure shown in FIG. 13 is basically the same as the supporting structure shown in FIG. 11. According to the present example, the shape of a central through hole 13C is basically rectangular except that curved profiles 13c are formed at the four corners of the rectangular shape, respectively. The shape of the through hole may be changed, as described above, to change the length of the bonding wire, so that the characteristic frequency thereof can be changed.

Figure 14:
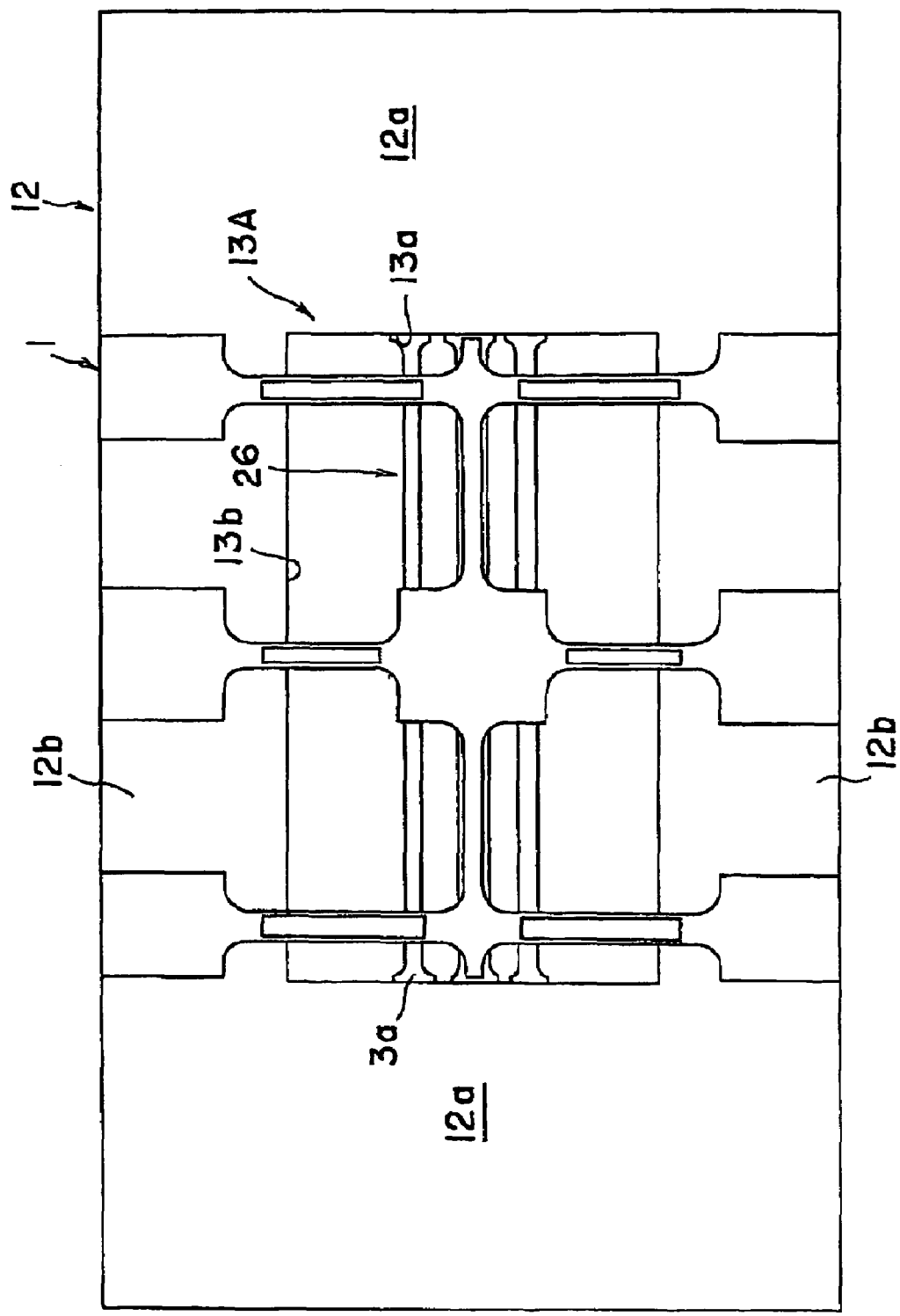
FIG. 14 is a plan view schematically showing a supporting structure according to still another embodiment of the present invention.

According to an example of FIG. 14, three bonding wires 26 are protruded from each of a pair of opposing edges 13a of the fixed portion 12a facing the through hole 13A. The bonding wire is straight and has a substantially constant over the whole length. The tip end of the bonding wire is joined with a predetermined position of the base portion 2 of the vibrator 1.

Figure 15:
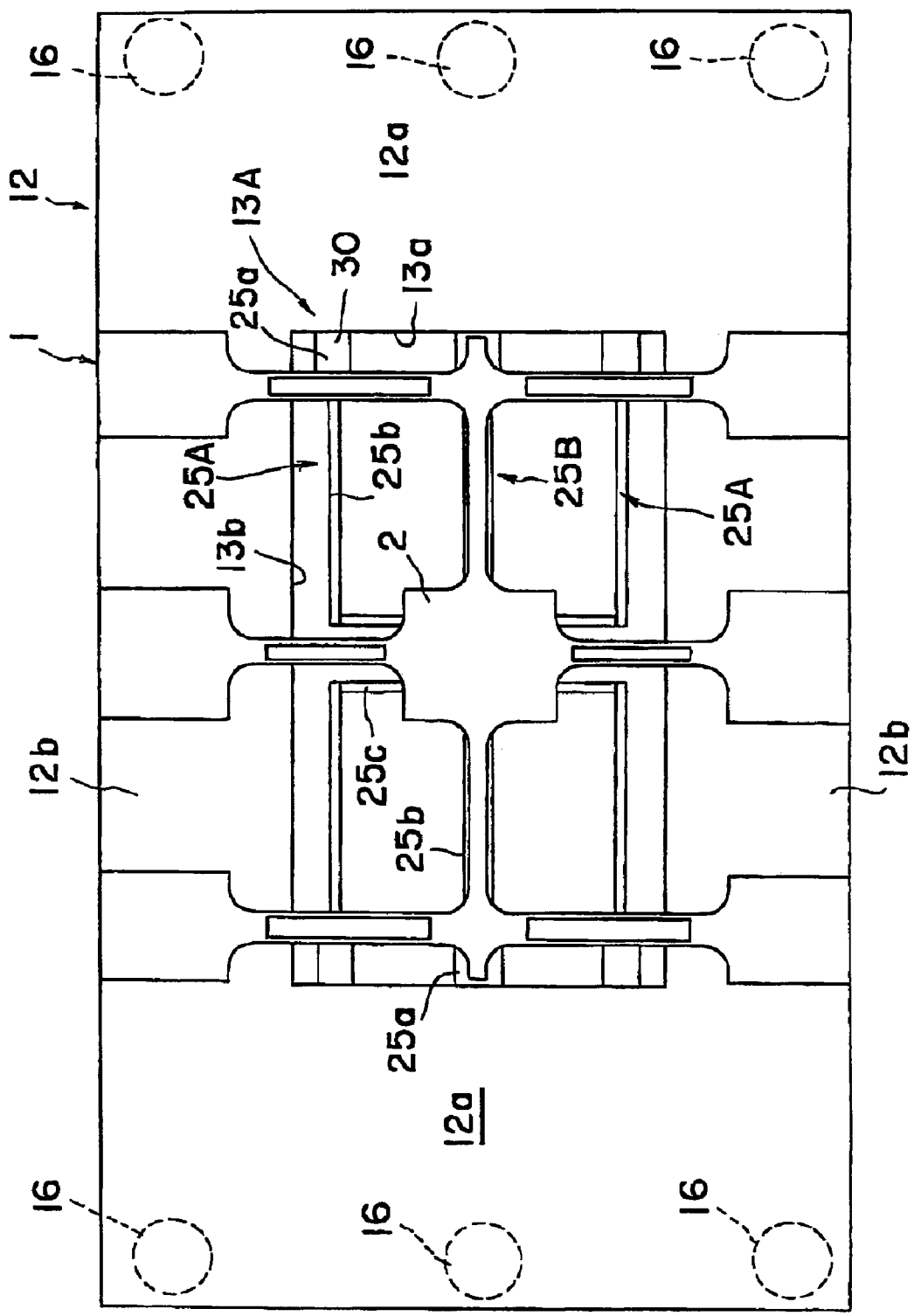
FIG. 15 is a plan view schematically showing a supporting structure according to still another embodiment of the present invention.

According to an example of FIG. 15, a central through hole 13A is provided in the substrate 12. The shape of the central through hole 13A is elongate, for example, substantially rectangular. A pair of fixed portions 12a opposing each other and a pair of non-fixed portions 12b opposing each other are provided so that the fixed portion 12a and non-fixed portions 12b together define the through hole 13A.

According to the present example, the vibrator is supported with four bonding wires 25A and two bonding wires 25B. Each bonding wire is joined with and fixed to the fixed portion 12a of the substrate 12, and protruded from the opposing edge 13a on the side of the fixed portion 12a toward the base portion 2.

Each bonding wire 25A is protruded from the end of each of the opposing edges 13a and bent substantially according to "L" character in a plan view. That is, the bonding wire 25A has a wider portion 25a extending in a direction substantially parallel with the opposing edge 13b facing the through hole 13, a narrower portion 25b and a bent portion 25c extending in a direction substantially parallel with the opposing edge 13a. The tip end of the bent portion 25c is joined with an electrode provided in the base portion 2.

Further, each of two bonding wires 25B is protruded from the center of each of the opposing edges 13a and has a wider portion 25a and a narrower portion 25b. The tip end of the narrower portion 25b is joined with the base portion 2. According to the present example, each of the bonding wires 25A and 25B has a wider portion 25a and a narrower portion 25b. According to the present example, however, the wider portion 25a is shorter than that shown in FIG. 5.

According to a preferred embodiment, the bonding wire has a protruding portion protruding from the fixed portion toward the through hole and a plurality of bent portions between the protruding portion and the position where the bonding wire is bonded with the vibrator. The longitudinal directions of the bent portions are different from each other.

Figure 16:
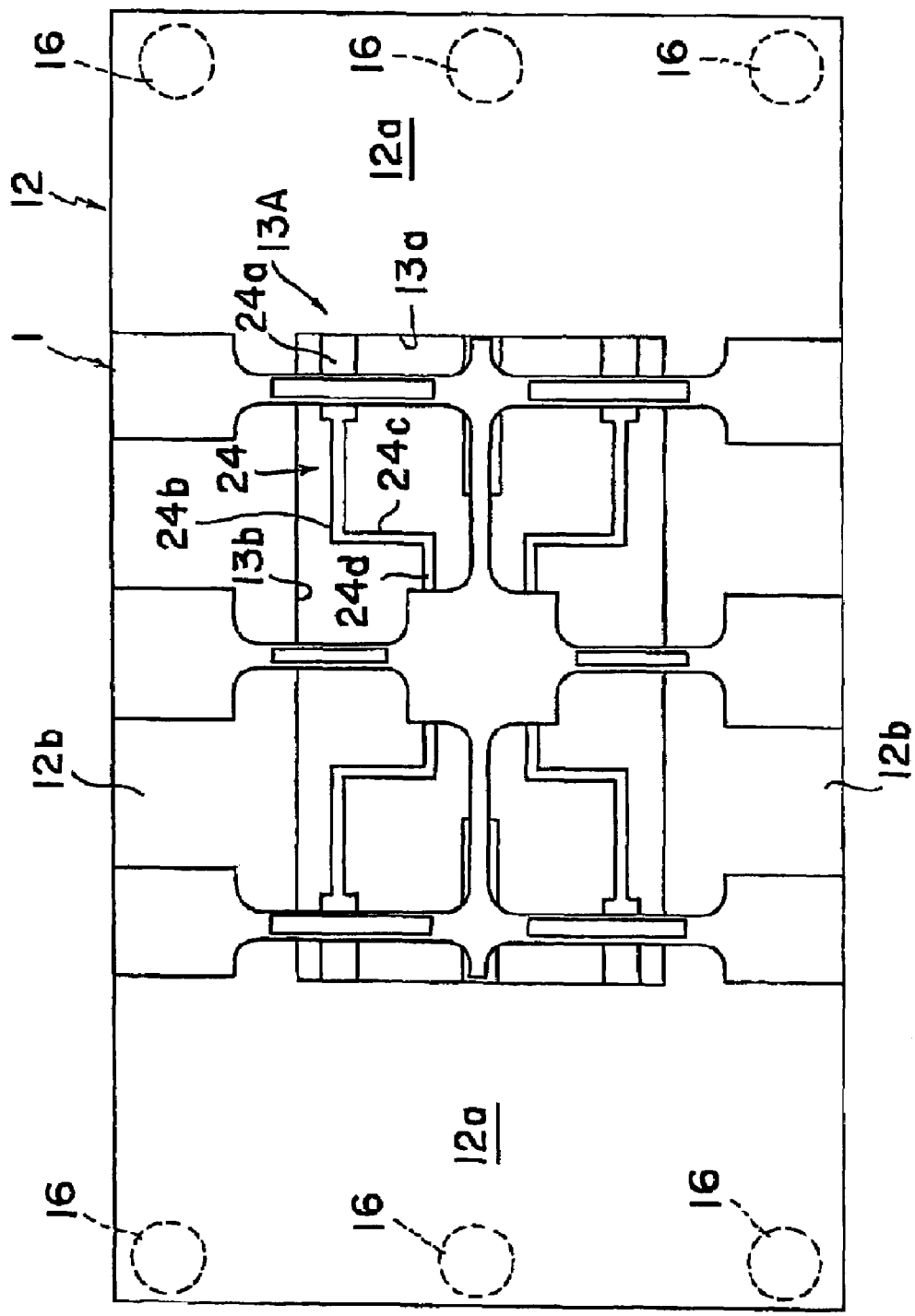
FIG. 16 is a plan view schematically showing a supporting structure according to still another embodiment of the present invention.

According to an example shown in FIG. 16, a wire 24 of a shape of a crank is used instead of the wire 14A having a shape of "L" character shown in FIG. 5. The wire 24 has a wider portion 24a, a narrower portion 24b, a bent portion 24c protruding inside from the narrower portion 24b and an additional bent portion 24d. The characteristic frequency of vibration of the wire can be changed by increasing the number of bent portions thereof.

Figure 17:
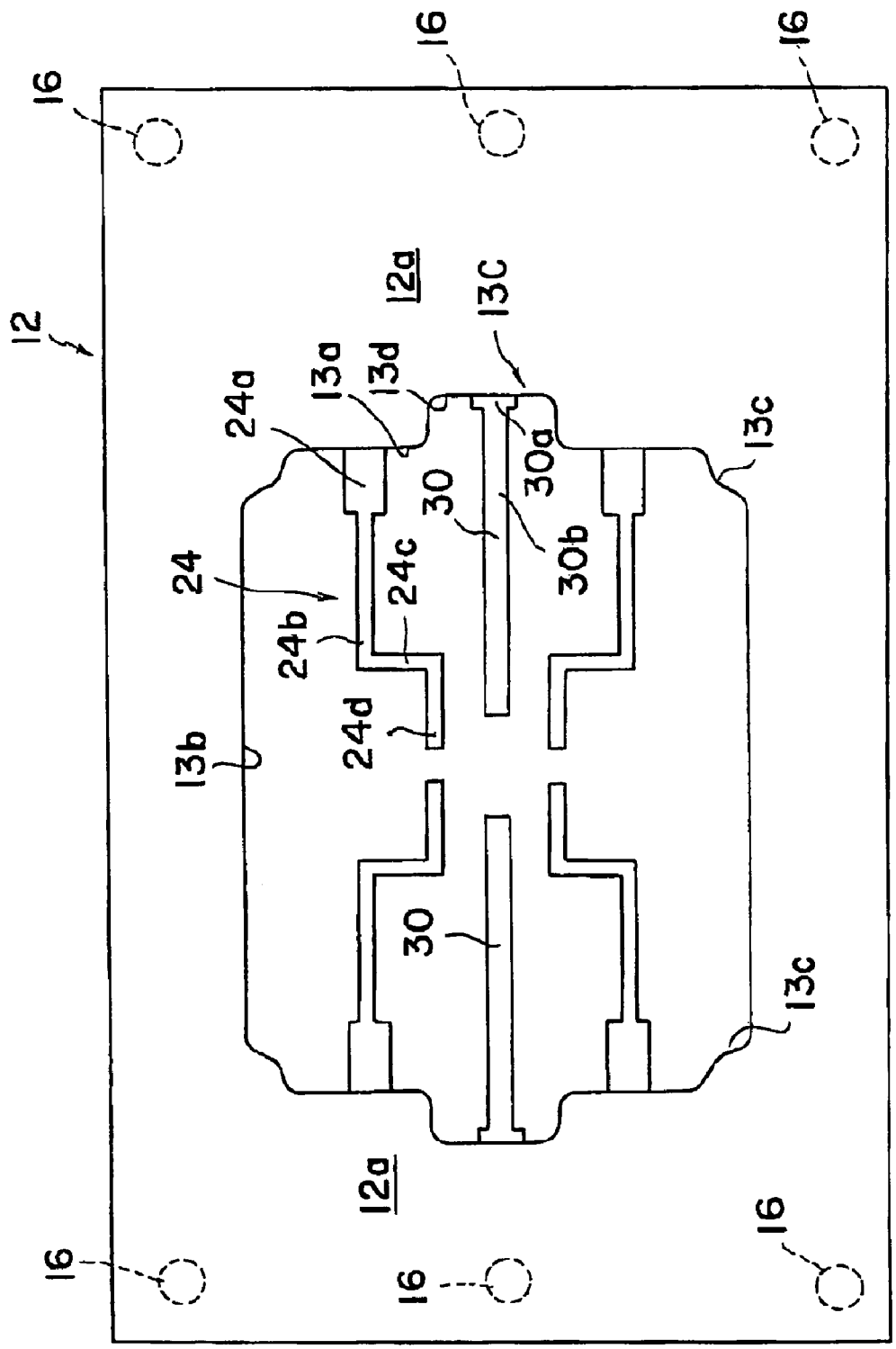
FIG. 17 is a plan view showing the shapes of bonding wires and a substrate usable for the present invention.

According to an example of FIG. 17, the shape of the central through hole 13C is substantially rectangular except that curved profiles 13c are formed at the four corners of the rectangular shape, respectively. Further, short edges 13a and 13d are provided to slightly reduce the length of the bonding wire 24 so that the bonding wire 30 is made slightly longer. Each of the four bonding wires 24 having a shape of crank is protruded from the shorter edge 13a and has a wider portion 24a, a narrower portion 24b, a bent portion 24c protruding inside of the narrower portion 24b and an additional bent portion 24d. Each straight bonding wire 30 protrudes from the shorter edge 13d and has a wider portion 30a and a narrower portion 30b.

Figure 18:
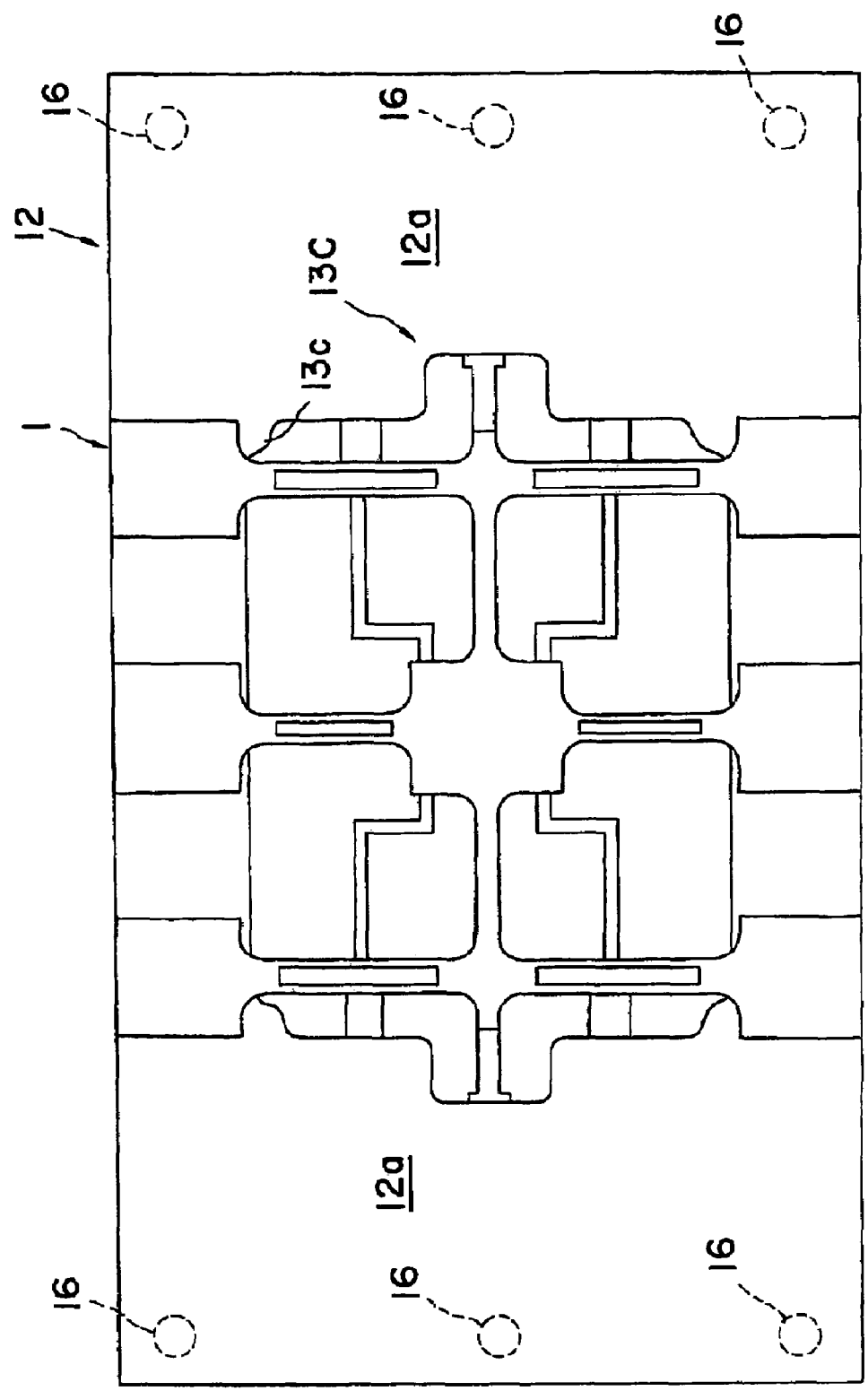
FIG. 18 is a plan view showing a vibrator supported over the substrate of FIG. 17.

FIG. 18 is a plan view showing a vibrator whose base portion is supported with six bonding wires shown in FIG. 17.

The end of each bonding wire may be joined with a terminal portion on the lower face of the vibrator, or, may be joined with a terminal portion on the upper face of the vibrator.

The dimensions of the vibrator are not particularly limited. However, if the weight or dimensions of the vibrator is too large, too much weight may be applied on the bonding wire to possibly deform the bonding wire over a long period of time. The width of the vibrator may preferably be not larger than 10 mm and more preferably be not larger than 5 mm for preventing adverse effects of the deformation of the bonding wire on the vibration. On this viewpoint, the weight of the vibrator may preferably be not larger than 5 mg and more preferably be not larger than 1 mg. Further, the thickness of the vibrator may preferably be not larger than 0.3 mm and more preferably be not larger than 0.2 mm.

The material for the substrate 12 is not particularly limited and may be an insulating material, used for a package, such a ceramics, glass or resin.

The bonding wire may be joined with the vibrator by means of a process not particularly limited, including bonding by heat pressing, ultrasonic bonding, spot welding, a conductive adhesive or soldering.

It is necessary to support the vibrator so that the vibrator does not directly contact the substrate for preventing the adverse effects on the vibration. According to a preferred embodiment, the distance between the vibrator and substrate is not smaller than 0.1 mm and more preferably is not smaller than 0.2 mm.

The material of the bonding wire is not particularly limited and may be a metal, resin, adhesive or a composite material of a metal and resin, and more preferably be a metal. Copper, gold, aluminum, silver, tungsten, stainless steel, iron, nickel, tin, brass, or the alloys thereof are most preferred.

These metals or alloys may be surface treated by plating or the like. For example, copper foil with gold plating is particularly preferred.

The material of the vibrator is not particularly limited, and may preferably be a piezoelectric single crystal. The material may more preferably be a piezoelectric single crystal selected from the group consisting of quartz, lithium niobate, lithium tantalate, lithium niobate-lithium tantalate solid solution, lithium borate and langasite.

A physical quantity measured according to the present invention is not particularly limited. When a driving vibration is excited in a vibrator and the vibration state of the vibrator is changed due to the effects of a specific physical quantity exerted on the vibrator, the physical quantity is included in the present invention as far as the physical value can be detected through a detection circuit. Such physical quantity may preferably be an acceleration, an angular acceleration or an angular velocity applied on a vibrator. The measuring system of the present invention may preferably be an inertia censor.

EXAMPLES

Comparative Example 1

The vibrator 1A shown in FIGS. 1 and 2 was used. Specifically, a chromium film of 100 angstroms in thickness and a gold film of 1500 angstroms in thickness were formed in predetermined regions on a wafer made of a Z-plate of quartz with a thickness of 0.1 mm, by sputtering. Both main faces of the wafer were coated with resist films, respectively.

The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching. The wafer was etched by immersing the wafer in ammonium bifluoride at a temperature of 80° C. for 20 hours to form the external shape of the vibrator 1. A gold film having a thickness of 2000 angstrom was formed as a film for electrode on the chromium film having a thickness of 100 angstrom using a metal mask. The vibrator 1 had a length of 2.0 mm, a width of 2.2 mm, a thickness of 0.1 mm and a weight of about 0.3 mg.

The vibrator 1 was mounted in a package as shown in FIG. 10. The substrate 12 was formed of a joined body of a polyimide film and copper foil having a central through hole. The copper foil was etched to form the bonding wires, wirings and contact pads on the substrate 12. The frame was formed of alumina ceramics. The surface of the copper foil was covered with gold plating. The bonding wires were joined with the base portion 2 of the vibrator 1 through gold bump 25 by means of bonding by heat pressing.

According to the present example, each of the bonding wires had a straight shape and a width of 0.03 mm. The vibrator was supported with six bonding wires. Two of the six bonding wires were fixed onto the fixed portion 12a, and four of the six bonding wires were fixed onto the non-fixed portion 12b.

The thus obtained vibratory gyroscope was contained in a temperature test bath and the temperature was changed in a range of minus 40 to plus 85° C. The driving vibration was excited using a self-oscillation circuit so that the resonance frequency "fd" of the driving vibration mode was set at 45000 Hz.

Figure 3:
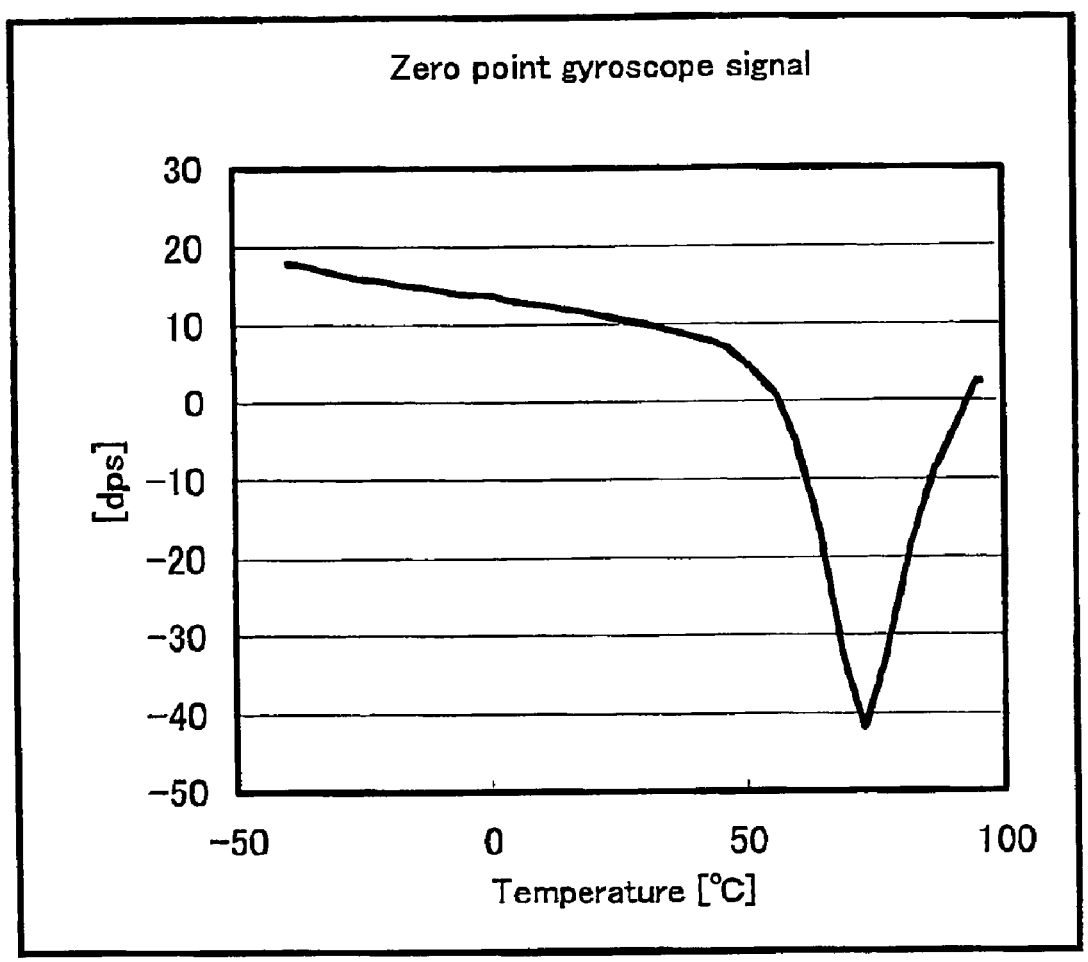
FIG. 3 is a graph showing the relationship of the zero point gyro component and temperature in a comparative example.

The thus obtained detection signal was processed to draw a zero point gyroscope signal. It was thus proved that a peak zero point temperature drift was detected in room temperature range, as shown in FIG. 3. The magnitude of the zero point temperature drift was proved to be 56 dps.

The zero point temperature drift was calculated as follows. The data of the zero point gyroscope signal component was plotted as a function of temperature to provide a graph. The graph excluding the peak was approximated by a straight line in a range of minus 40 to plus 85° C. The height of the peak with respect to the straight line was calculated and assigned to the zero point temperature drift.

Example 1

Figure 4:
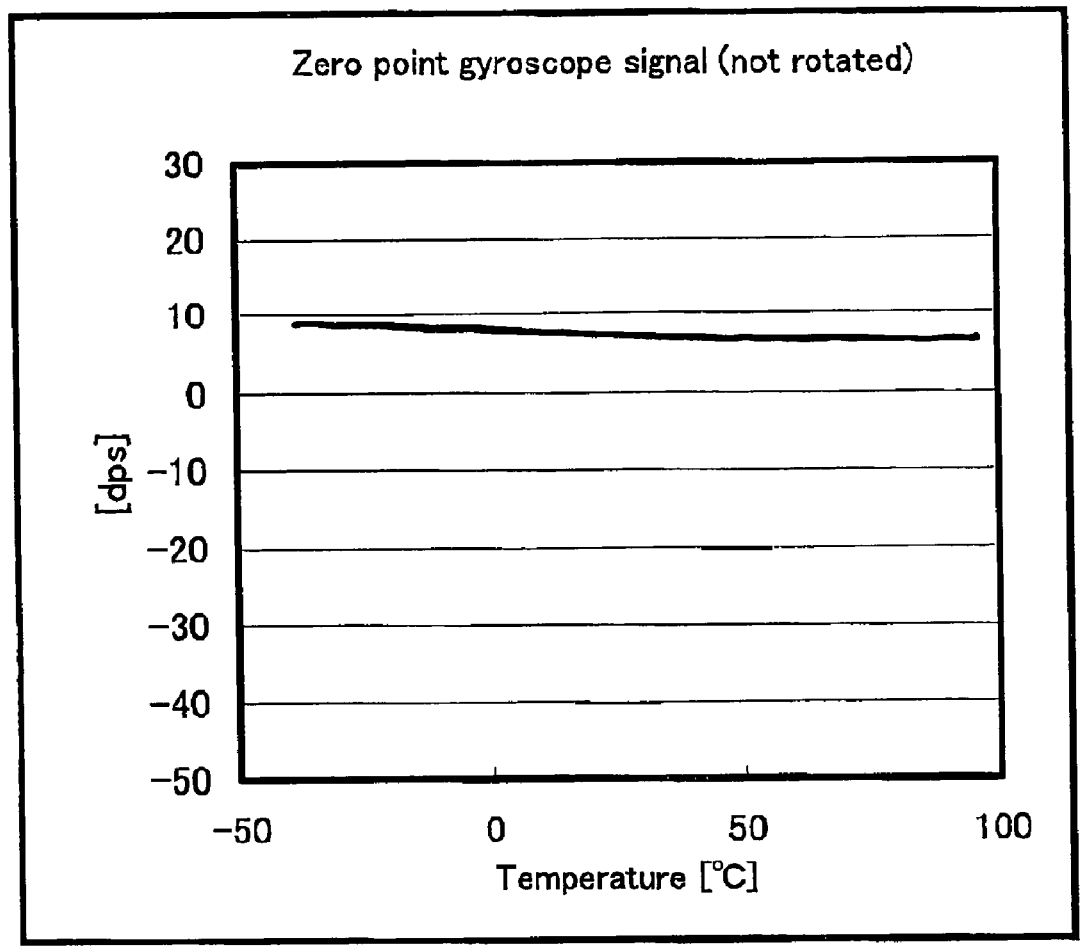
FIG. 4 is a graph showing the relationship of the zero point gyro component and temperature in an example according to the present invention.

The vibrator 1 was supported on the substrate according to the same procedure as the comparative example 1, except that the supporting structure shown in FIG. 16 was applied. The dependency of the zero point gyroscope signal component on temperature was shown in FIG. 4. The zero point temperature drift was proved to be 2.5 dps. That is, the zero point gyroscope signal component was gradually lowered substantially according to a linear function between minus 40 to plus 85° C., and a substantial zero point temperature drift was not observed.

Example 2

Figure 19:
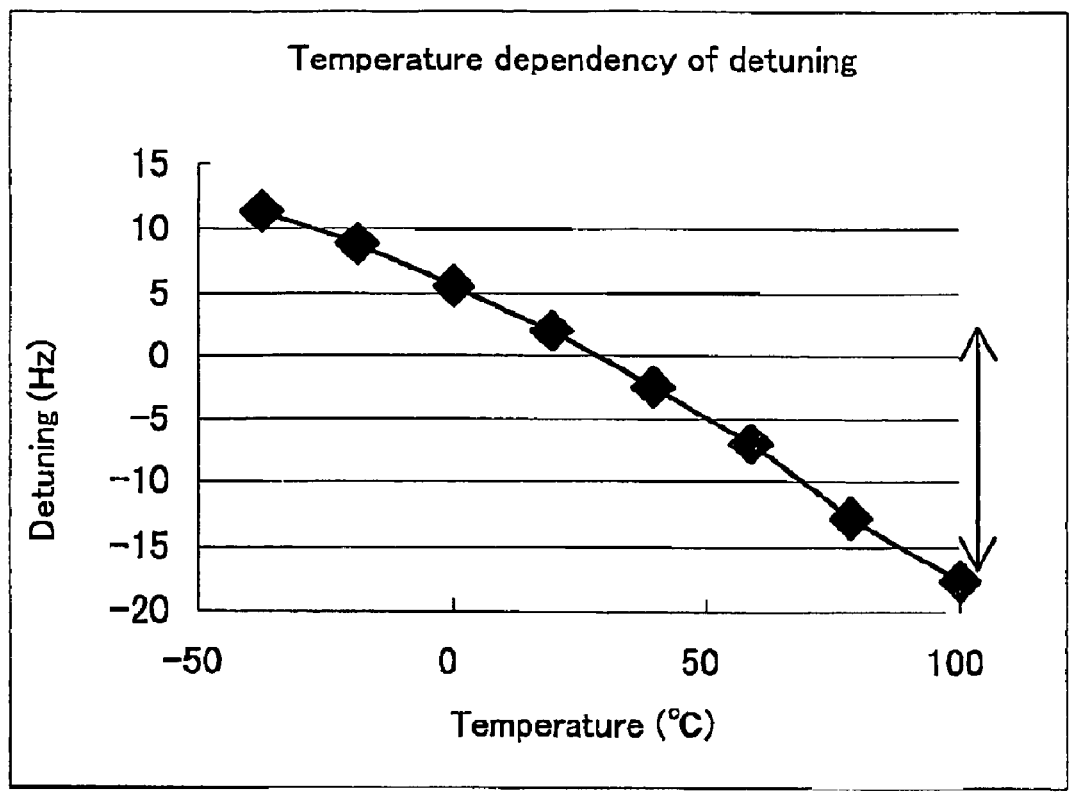
FIG. 19 is a graph showing the temperature change of detuning according to the example of the present invention.

The vibrator 1 was supported on the substrate according to the same procedure as the comparative example 1, except that the supporting structure shown in FIG. 12 was applied. The dependency of the detuning frequency, which is a difference between the driving frequency and the detection frequency, on temperature was shown in FIG. 19. That is, the detuning was reduced substantially according to a linear function in a range of minus 40 to plus 85° C. The zero point temperature drift was proved to be 7 dps.

Example 3

Figure 20:
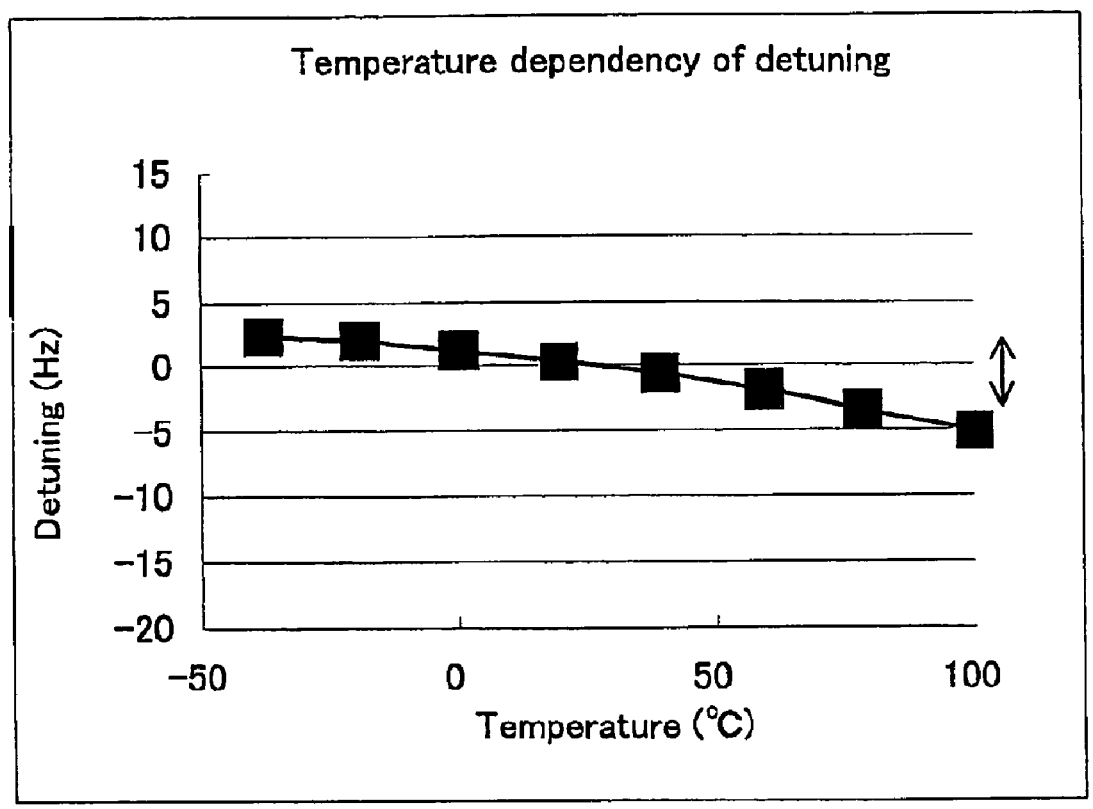
FIG. 20 is a graph showing the temperature change of detuning according to the example of the present invention.

The vibrator 1 was supported on the substrate according to the same procedure as the comparative example 1, except that the supporting structure shown in FIG. 5 was applied. As a result, the dependency of detuning on temperature was shown in FIG. 20. That is, the detuning was reduced substantially according to a linear function in a range of minus 40 to plus 85° C. The zero point temperature drift was proved to be 5 dps.

Example 4

The vibrator 1 was supported on the substrate according to the same procedure as the comparative example 1, except that the supporting structure shown in FIG. 6 was applied. The zero point temperature drift was proved to be 6 dps.

Example 5

The vibrator 1 was supported on the substrate according to the same procedure as the comparative example 1, except that the supporting structure shown in FIG. 8 was applied. The zero point temperature drift was proved to be 6 dps.

The present invention has been explained referring to the preferred embodiments, however, the present invention is not limited to the illustrated embodiments which are given by way of examples only, and may be carried out in various modes without departing from the scope of the invention.

The invention claimed is:

1. A structure for supporting a vibrator, said structure comprising:
    a substrate comprising a pair of fixed portions opposing each other and a pair of non-fixed portions opposing each other, said fixed and non-fixed portions together defining a through hole in said substrate; and
    first, second and third pairs of bonding wires fitted to said substrate and connected to said vibrator, said first pair being aligned substantially along a central axis "X" of the substrate, said second pair being provided on one side of said central axis "X," and said third pair being provided on another side of said central axis "X,"
    wherein said vibrator is supported with only said bonding wires that contact only the fixed portions of the substrate so that said vibrator is not directly contacted with said substrate.

2. The supporting structure of claim 1, said vibrator comprising a base portion supported over said through hole and a vibrating arm protruding from said base portion.

3. The supporting structure of claim 2, wherein at least one of said bonding wires comprises a protruding portion protruding from said fixed portion toward said through hole and a bent portion bending from said protruding portion toward the position where said at least one of said bonding wires is bonded with said vibrator.

4. The supporting structure of claim 2, wherein at least one of said bonding wires comprises a protruding portion protruding from said fixed portion toward said through hole and a plurality of bent portions between said protruding portion and the position where said at least one of said bonding wires is bonded with said vibrator, said bent portions comprising their longitudinal directions different from each other.

5. The supporting structure of claim 1, wherein at least one of said bonding wires comprises a protruding portion protruding from said fixed portion toward said through hole and a bent portion bending from said protruding portion toward the position where said at least one of said bonding wires is bonded with said vibrator.

6. The supporting structure of claim 1, wherein at least one of said bonding wires comprises a protruding portion protruding from said fixed portion toward said through hole and a plurality of bent portions between said protruding portion and the position where said at least one of said bonding wires is bonded with said vibrator, said bent portions comprising their longitudinal directions different from each other.

7. The supporting structure of claim 1, wherein said non-fixed portion and the position where at least one of said bonding wires protrudes from said fixed portion are distant from each other by 0.1 mm or more.

8. The supporting structure of claim 1, wherein said fixed portion is joined with an underlying substrate at a plurality of positions with a conductive adhesive.

9. A device for measuring a physical quantity comprising a vibrator responsive to a physical quantity and a structure for supporting said, said structure comprising:
    a substrate comprising a pair of fixed portions opposing each other and a pair of non-fixed portions opposing each other, said fixed and non-fixed portions together defining a through hole in said substrate; and
    first, second and third pairs of bonding wires fitted to said substrate and connected to said vibrator, said first pair being aligned substantially along a central axis "X" of the substrate, said second pair being provided on one side of said central axis "X," and said third pair being provided on another side of said central axis "X,"
    wherein said vibrator is supported with only said bonding wires that contact only the fixed portions of the substrate so that said vibrator is not directly contacted with said substrate.

10. The device for measuring a physical quantity of claim 9, said vibrator comprising a base portion supported over said through hole and a vibrating arm protruding from the base portion.

11. The device for measuring a physical quantity of claim 10, wherein at least one of said bonding wires comprises a protruding portion protruding from said fixed portion toward said through hole and a bent portion bending from said protruding portion toward the position where said at least one of said bonding wires is bonded with said vibrator.

12. The device for measuring a physical quantity of claim 9, wherein at least one of said bonding wires comprise a protruding portion protruding from said fixed portion toward said through hole and a bent portion bending from said protruding portion toward the position where said at least one of said bonding wires is bonded with said vibrator.

13. A device for measuring a physical quantity comprising a vibratory gyroscope, said vibratory gyroscope comprising a structure for supporting a vibrator, said structure comprising:
- a substrate comprising a pair of fixed portions opposing each other and a pair of non-fixed portions opposing each other, said fixed and non-fixed portions together defining a through hole in said substrate; and
- first, second and third pairs of bonding wires fitted to said substrate and connected to said vibrator, said first air pair being aligned substantially along a central axis "X" of the substrate, said second pair being provided on one side of said central axis "X," and said third pair being provided on another side of said central axis "X,"

wherein said vibrator is supported with only said bonding wires that contact only the fixed portions of the substrate so that said vibrator is not directly contacted with said substrate.

14. The device for measuring a physical quantity of claim 13, said vibrator comprising a base portion supported over said through hole and a vibrating arm protruding from said base portion.

15. The device for measuring a physical quantity of claim 14, wherein at least one of said bonding wires comprises a protruding portion protruding from said fixed portion toward said through hole and a bent portion bending from said protruding portion toward the position where said at least one of said bonding wires is bonded with said vibrator.

16. The device for measuring a physical quantity of claim 13, wherein at least one of said bonding wires comprises a protruding portion protruding from said fixed portion toward said through hole and a bent portion bending from said protruding portion toward the position where said at least one of said bonding wires is bonded with said vibrator.

* * * * *